(12) United States Patent
Stewart et al.

(10) Patent No.: US 6,666,499 B2
(45) Date of Patent: Dec. 23, 2003

(54) LIMOUSINE UTILITY VEHICLE

(76) Inventors: Glenn A. Stewart, 2217 Third St., Alexandria, LA (US) 71301; Michael A. Richardson, 4803 Neil St., Alexandria, LA (US) 71301

( * ) Notice: Subject to any disclaimer, the term of this patent is extended or adjusted under 35 U.S.C. 154(b) by 0 days.

(21) Appl. No.: 10/057,347

(22) Filed: Jan. 28, 2002

(65) Prior Publication Data

US 2003/0141744 A1 Jul. 31, 2003

(51) Int. Cl.[7] ................................................. B62C 1/02
(52) U.S. Cl. ..................................... 296/185; 296/183
(58) Field of Search ................................ 296/185, 197, 296/1.1, 183, 193.08, 187.11, 16, 17, 1.01, 1.02, 193.04, 193.05, 64; D12/86, 90, 91, 92, 82, 159, 190

(56) References Cited

U.S. PATENT DOCUMENTS

| | | | | |
|---|---|---|---|---|
| 4,014,585 A | * | 3/1977 | Earnhart | 296/16 |
| 4,231,144 A | * | 11/1980 | Bernacchia, Jr. | 29/401.1 |
| 5,056,849 A | * | 10/1991 | Norris, Jr. et al. | 296/65.1 |
| 5,975,607 A | * | 11/1999 | Stewart | 296/17 |
| 6,131,284 A | * | 10/2000 | Basler | 29/897.2 |
| D443,574 S | * | 6/2001 | Lian | D12/196 |
| 6,276,477 B1 | * | 8/2001 | Ida | 180/89.1 |
| 6,447,054 B1 | * | 9/2002 | Pietryga et al. | 296/202 |

* cited by examiner

Primary Examiner—Stephen T. Gordon
Assistant Examiner—Greg Blankenship
(74) Attorney, Agent, or Firm—Kenneth D. Baugh

(57) ABSTRACT

A utility vehicle 10 is provided with an extended chassis 12. The utility vehicle 10 is provided to accommodate a driver's compartment 50 having a seat 56 for a driver and a plurality of passengers. A first passenger compartment 60 is provided behind the driver compartment 50 having a seat 62 for seating a second plurality of passengers thereon. A second passenger compartment 66 is formed on the extended chassis 12 behind the first passenger compartment 60. The second passenger compartment 66 is provided with a seat 68 for seating a third plurality of passengers thereon. A storage compartment 80 is also provided directly behind the second passenger compartment 66. Side access doors 58, 64 and 70 are provided for the driver's compartment, first passenger compartment 60 and second passenger compartment 66, respectively. A rear access door 84 is provided so that the cargo can be put in and taken out of the utility vehicle 10 as desired.

8 Claims, 6 Drawing Sheets

LIMOUSINE UTILITY VEHICLE

TECHNICAL FIELD

This invention relates to a utility vehicle, and more particularly, to a utility vehicle having an extended chassis for providing maximum passenger seating while still allowing the most comfortable and efficient passenger access to all seating in the vehicle.

The utility vehicle and its practicality has become well known. As a result the utility vehicle has become an accepted as well as popular mode of transportation. Utility vehicles are presently available to motorist in a variety of sizes and styles. Unfortunately, they have rather limited passenger carrying capacity when passenger access to the vehicle seating is most comfortable and efficient. This situation is most apparent in those vehicles that carry more than six people when it is desired to carry those extra passengers over six people. The vehicles available that carry more than six passengers don't allow the most comfortable and easy access to all seating areas. In those situations when it is desirable to maintain maximum comfort and effective access to the vehicle seating separate vehicles may sometimes be preferable to accommodate the extra passengers. Of course this method of accommodating extra passengers and assuring comfortable access in and out of the vehicle is not always available and of course is not the most desirable and cost effective.

Accordingly a utility vehicle design which can accommodate more passengers than presently available in utility vehicles while providing improved side access to all seating areas of the vehicle is desirable.

BACKGROUND OF THE ART

Attempts have been made to provide vehicles that allow maximum multi-passenger seating capacity with convenient passenger access. One such vehicle is disclosed in U.S. Pat. No. 4,231,144. This vehicle is designed to accommodate maximum passenger capacity. However, this vehicle is provided with an entrance to the vehicle through a driver operated door and an entrance and access to a passenger compartment from one side of the chassis of the vehicle. This vehicle although it transports multiple passengers is more of a truck or van like vehicle thus only limited passenger access is available because seat access is available from only one side of the vehicle. Additionally it is not a utility vehicle. Accordingly what is desirable is a utility vehicle which has the capacity to transport a maximum predetermined number of passengers while still allowing passenger access to seating of the vehicle from each side of the vehicle.

DISCLOSURE OF THE INVENTION

A utility vehicle in accordance with the principles of this invention is provided with front and rear members and an extended chassis coupled between the front and rear members. Side members are coupled to each side of the chassis and an upper member is coupled to the side members a predetermined distance above the chassis. A motor compartment is located on a first predetermined portion of the chassis and a driver's compartment is located on a second predetermined portion of the chassis behind the motor compartment. A first means for seating a driver and a plurality of passengers thereon is transversely mounted on the chassis in the drivers compartment. A first passenger compartment is located on a third predetermined portion of the chassis separate from and behind the driver's compartment. A second means for seating a second plurality of passengers thereon is mounted on the chassis in the passenger compartment. A second passenger compartment is located on a fourth predetermined portion of the chassis separate from the first passenger compartment. A third means mounted on the chassis in the second passenger compartment is provided to seat a third plurality of passengers thereon and is aligned and spaced behind the second means. A storage compartment is positioned on the chassis on a fifth predetermined portion of the chassis behind the second passenger compartment. The storage compartment occupies a space on the chassis substantially equal to the space occupied by both the first and second passenger compartments together. The utility vehicle is also provided with a first access means for providing access to the driver's compartment from each side of the chassis. A second access means is provided for allowing access to the first passenger compartment adjacent the second seating means from each side of the chassis. The third access means is provided for allowing access the second passenger compartment adjacent the third seating means from each side of the chassis. A fourth access means is provided which permits access to the storage compartment from the rear of the vehicle so that cargo can be put in and taken out of the vehicle as desired.

BRIEF DESCRIPTION OF THE INVENTION

The details of the invention will be described in connection with the accompanying drawing in which.

BEST MODE FOR CARRYING OUT THE INVENTION

Referring to FIGS. 1,2,3 and 4 a utility vehicle, generally designated by the numeral, 10 is illustrated. The utility vehicle 10 is provided with an elongated body, generally designated, by the numeral, 12. The elongated body 12 is provided with an extended chassis 14 which is dimensioned so that the length of the utility vehicle 10 can be at least sixty (60) inches longer than the normal utility vehicle chassis.

Figure 5:
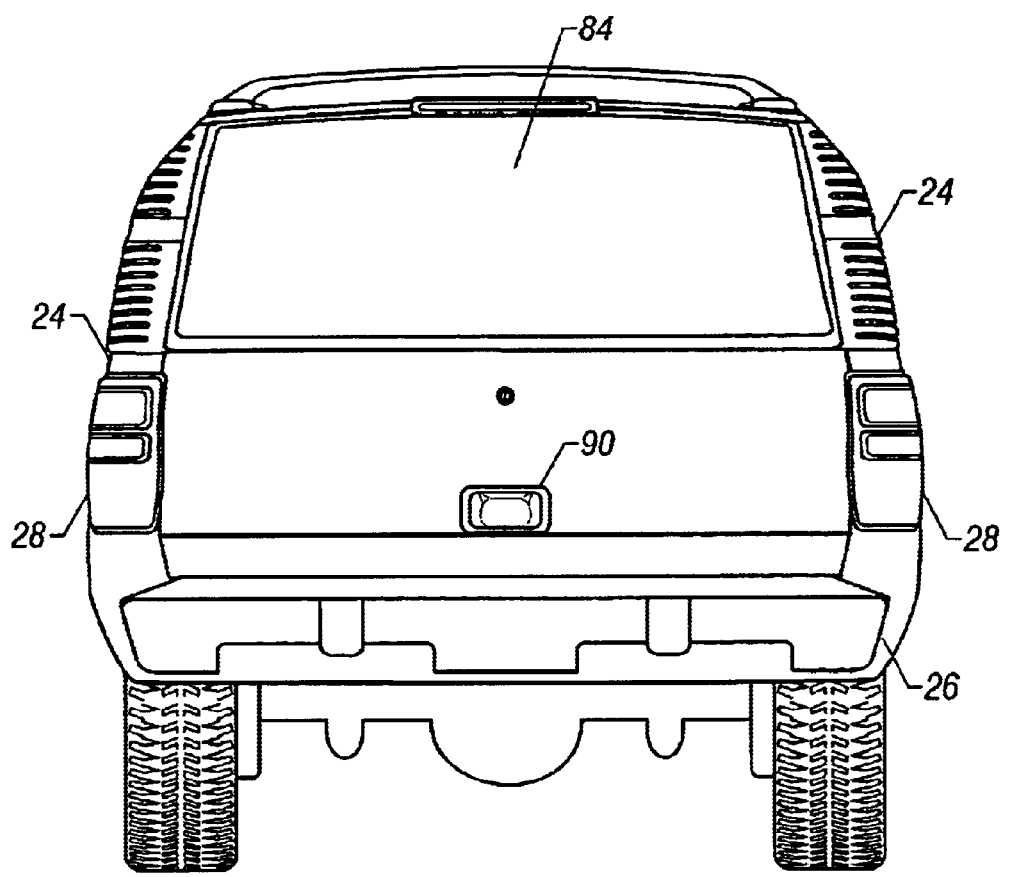
FIG. 5 is a rear elevation view of a utility vehicle in accordance with the principles of the invention.
Figure 6:
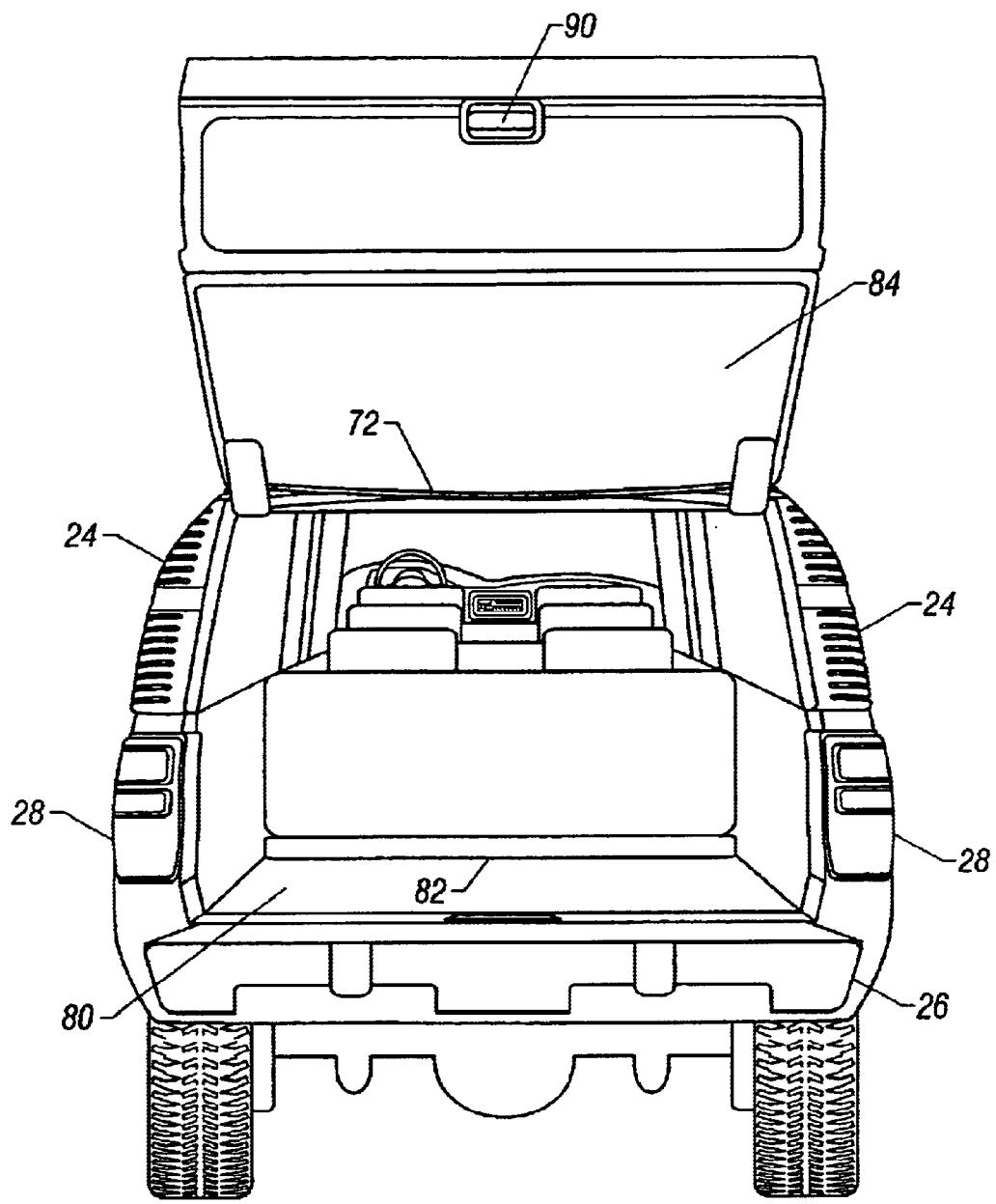
FIG. 6 is a rear elevation view of a utility vehicle in accordance with the principles of the invention with the rear door opened.

The elongated body 12 of the utility vehicle 10 is also provided with a roof, generally designated, by the numeral, 16. The roof 16 is coupled on each side thereof to intermediate door support members 18 and 20 (FIG. 3), a rear side panel 22 and a rear panel 24 (FIGS. 5 and 6) which are all coupled to the chassis 14 in a well known manner. The rear panel 24 includes a bumper assembly 26 and a light assembly 28 on each side thereof A windshield support member 30 including a windshield 32 is formed between the roof 16 and front side panels 34 of the vehicle 10. The front side panels 34 are coupled to a front panel 36. The front panel 36 of the utility vehicle 10 includes a bumper assembly 38 and light assembly 40 on each side thereof. The front side panels 34 and the front panel 36 form a motor compartment, generally designated, by the numeral, 44 which includes a hood 46 which provides access to the motor compartment and a motor assembly (not shown) in a well known manner.

Figure 1:
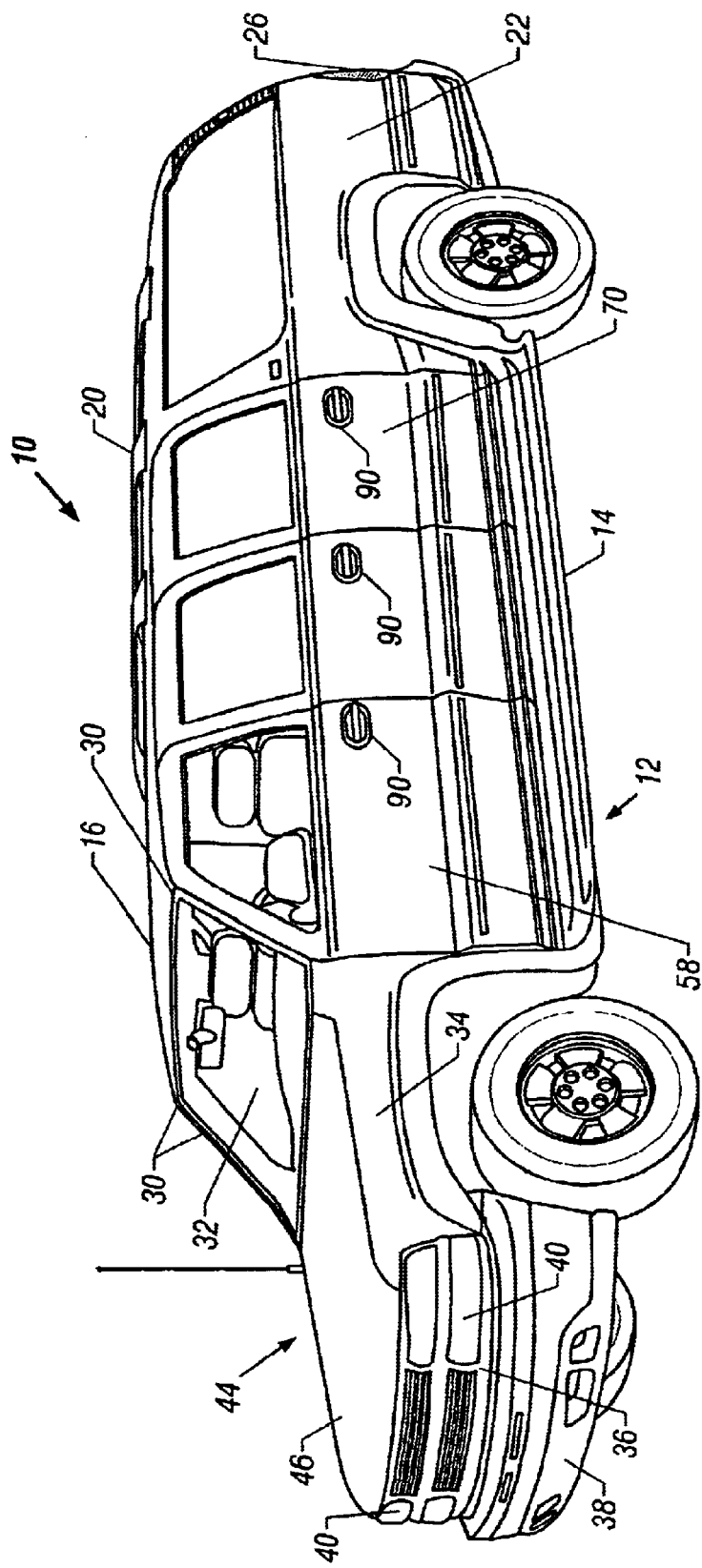
FIG. 1 is a perspective view illustrating a utility vehicle in accordance with the principles of the invention.
Figure 2:
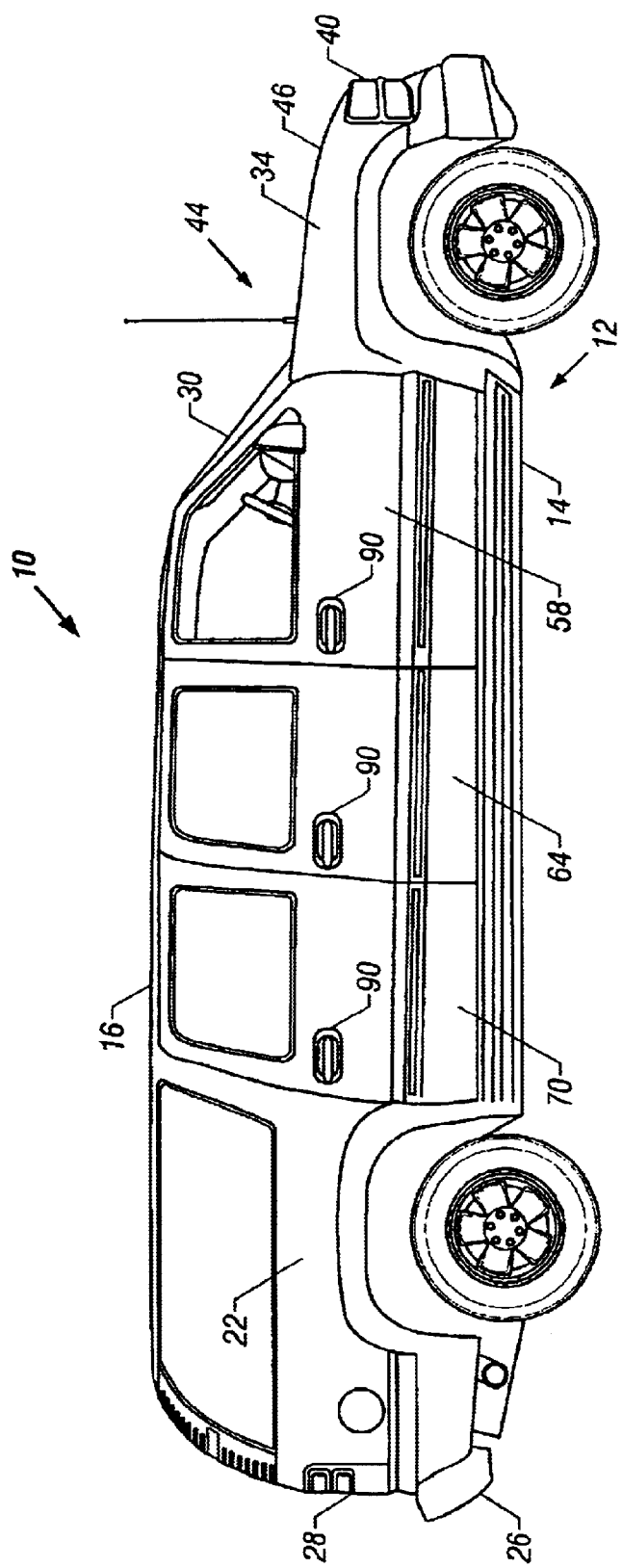
FIG. 2 is a side view illustrating a utility vehicle in accordance with the principles of the invention.
Figure 3:
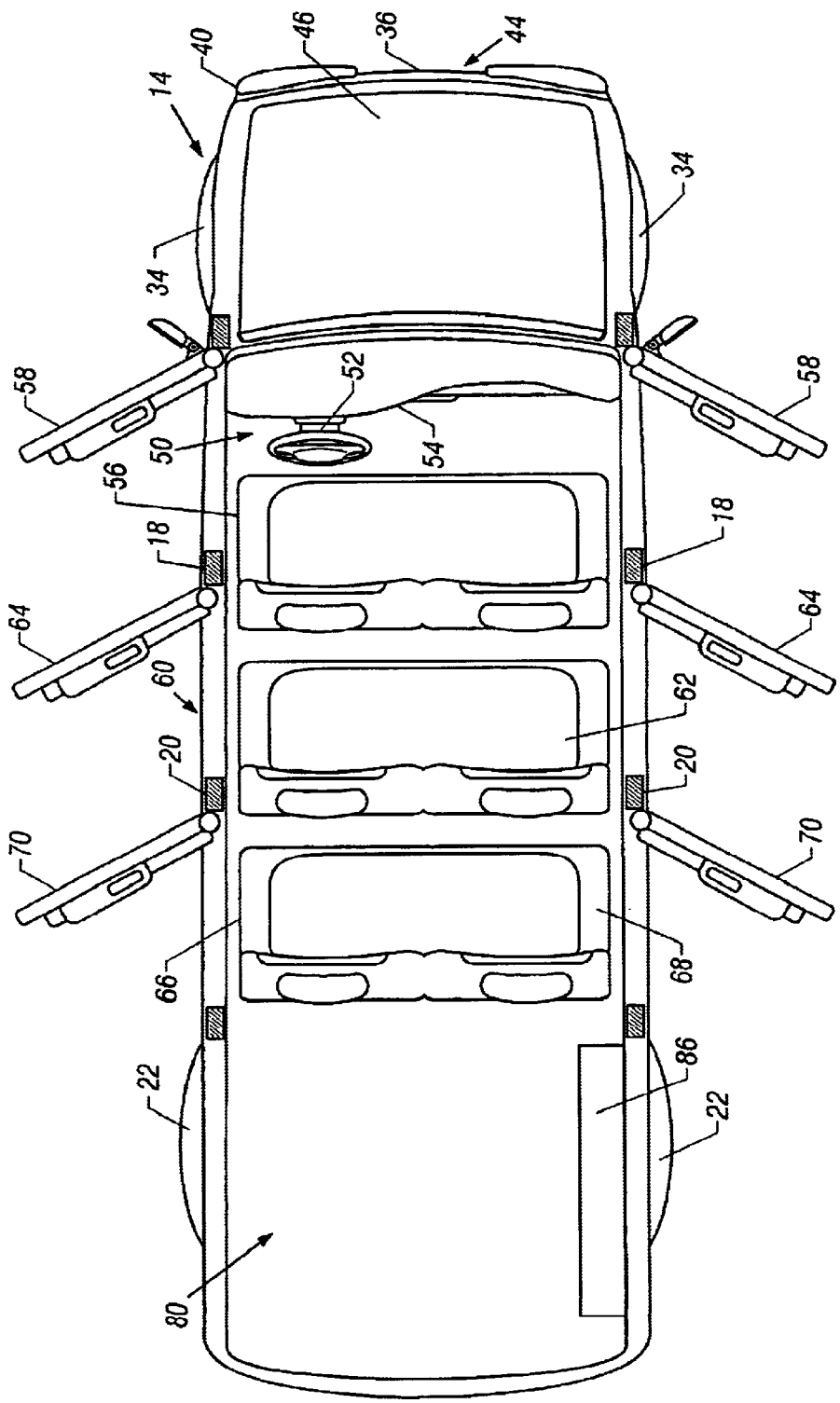
FIG. 3 is a fragmented plain view illustrating a utility vehicle in accordance with the principles of the invention with the roof removed and doors open.

The utility vehicle 10 is provided with a driver's compartment, generally designated, by the numeral, 50 (FIG. 3). The driver's compartment 50 is provided with a steering wheel assembly 52 as well as a dashboard assembly 54 both of which are standard equipment in a utility vehicle. The driver's compartment 50 is also provided with a seat 56, which can accommodate at least three persons, that is, a driver as well as two other passengers if desired.

A door 58 is mounted for pivotal movement between the front side panel 34 and door support member 18 on each side of the chassis 14 of the utility vehicle 10. The doors 58 are provided to allow access by the driver and any passengers to the driver's compartment 50 from either side of the compartment.

The utility vehicle 10 is also provided with a first passenger compartment, generally designated, by the numeral 60 (FIG. 3). The first passenger compartment 60 is located on the chassis 14 directly behind the driver's compartment 50. The first passenger compartment 60 is provided with a seat 62 which is mounted on the chassis 14 so that passengers seated therein will face the front of the utility vehicle 10. The seat 62 may be, for example, a bench type seat which is provided to seat at least three passengers when maximum passenger capacity is desirable. A door 64 is pivotably mounted to open and close between the door support members 18 and 20 on each side of the chassis 14 adjacent to the passenger compartment 60. The doors 64 allow access by passengers to and from the first passenger compartment 60 from each side of the compartment.

A second passenger compartment, generally designated, by the numeral, 66 is provided with a seat 68. The seat 68 is positioned in the passenger compartment 66 so that passengers seated in the seat 68 will face the front of the utility vehicle 10 and, may also, be for example a bench type seat which provides for maximum seating capacity. A door 70 is pivotably mounted to open and close between the door support member 20 and the rear side panel 22 on each side of the chassis 14 adjacent to the second passenger compartment 66. The doors 70 allow access by passengers to and from the second passenger compartments 66 from each side of the compartment.

Figure 4:
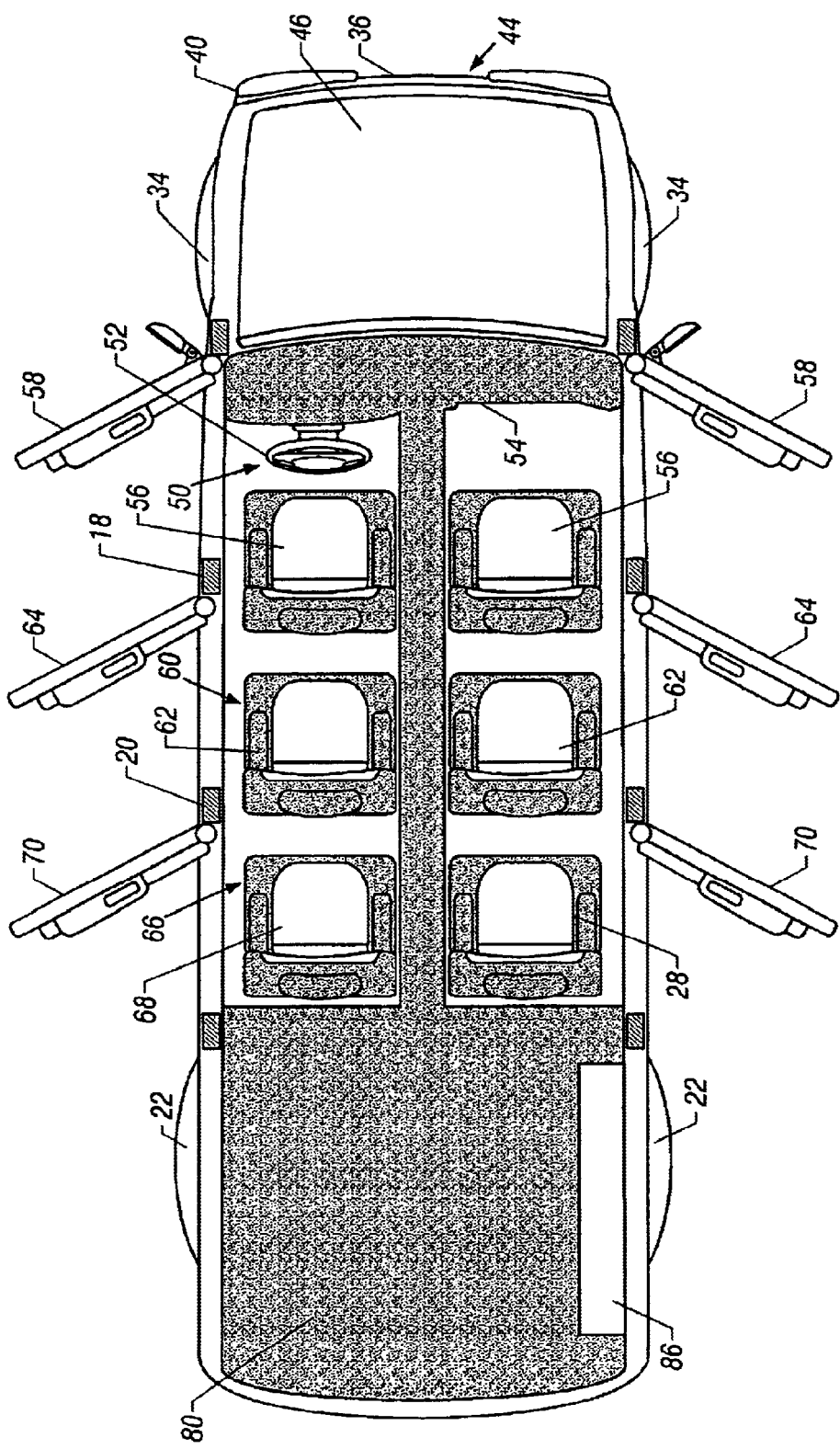
FIG. 4 is fragmented view of a second embodiment of a seating configuration of a utility vehicle in accordance with the principles of this invention with the roof removed and doors opened.

As illustrated in FIG. 4 the seats 56, 62 and 68 in the utility vehicle 10 may also be, for example, bucket type seats. This embodiment accommodates those situations where maximum passenger capacity is not of concern but allowing efficient and comfortable passenger access to and from the seats of vehicle 10 is.

The utility vehicle 10 is also provided with a storage compartment, generally designated, by the numeral, 80. The storage compartment 80 is positioned on the chassis 14 behind the passenger compartment 66 and extends the length of the rear side panels 22. The storage compartment 80 occupies an area on the extended chassis 14 which is substantially equal to or greater than the areas occupied by both the first and second passenger compartments 60 and 66. A rectangularly shaped compartment 86 is formed in the storage compartment 80. The compartment 86 is provided to store a spare tire. The rear panel 24 of the vehicle 10 is provided with an opening 82 (FIG. 6) for allowing access to the storage compartment 80 of the vehicle 10. A rear door 84 which is mounted on the upper side of the rear panel 24 is provided to cover the access opening 82 thereby permitting access to and from the storage compartment 80 from the rear of the vehicle 10. Each of the doors 58, 64, 70 and 84 of the utility vehicle 10 is provided with a handle assembly 90 which allows the doors to be opened from the inside and outside in a well known manner.

It should be understood that various changes and modifications can be made without departing from the spirit and scope of the invention as defined in the claims.

What is claimed:

1. A utility vehicle including:
   a front member;
   a rear member;
   an extended chassis, coupled between the front and rear member;
   side panel and support members coupled to each side of the chassis between the front member and rear member;
   an upper member coupled to the side panel and support members a predetermined distance above the chassis;
   a motor compartment positioned on a first predetermined portion of the chassis;
   a driver's compartment positioned on a second predetermined portion of the chassis behind the motor compartment;
   a first means traversely mounted in the driver's compartment for seating a driver and a first plurality of passengers;
   a first passenger compartment positioned on a third predetermined portion of the chassis behind the driver's compartment;
   a second means traversely mounted in the passenger compartment for seating a second plurality of passengers, the second means being aligned with and spaced from the first means so that the second plurality of passengers will face the front member;
   a second passenger compartment positioned on a fourth predetermined portion of the chassis behind the first passenger compartment;
   a third means traversely mounted in the second passenger compartment for seating a third plurality of passengers, the third means being aligned with and spaced from the second means so that the third plurality of passengers will face the front member;
   a storage compartment positioned on a fifth predetermined portion of the chassis behind the second passenger compartment, the storage compartment occupying a space on the chassis substantially equal to the space occupied by both the first and second passenger compartments;
   a first access means for providing access to the driver's compartment from each side of the chassis;
   a second access means for providing access to the first passenger compartment from each side of the chassis;
   a third access means for providing access to the second passenger compartment from each side of the chassis; and
   a fourth access means vertically mounted in the rear member for providing access to the storage compartment from the rear of the chassis.

2. A utility vehicle as defined in claim 1 wherein the side panel and support members include:

a first side panel mounted on each side of the chassis which extends from the front member to the beginning of the driver's compartment;

a first door support member mounted on each side of the chassis a predetermined distance from the first side panel so that a first access opening is formed therebetween;

a second door support member mounted on each side of the chassis a predetermined distance from the first door support member so that a second access opening is formed therebetween; and a second side panel mounted on each side of the chassis a predetermined distance from the second door support member and extending to the rear member so that a third access opening is formed between the second door support member and the second side panel.

3. A utility vehicle as defined in claim 2 wherein the first access means includes a first door pivotably mounted on each side of the chassis to selectively cover the first access opening.

4. A utility vehicle as defined in claim 3 wherein the second access means includes a second door pivotably mounted on each side of the chassis to selectively cover the second access opening.

5. A utility vehicle as defined in claim 4 wherein the third access means includes a third door pivotably mounted on each side of the chassis to selectively cover the third access opening.

6. A utility vehicle as defined in claim 5 wherein the rear member has a rear access opening formed therein.

7. A utility vehicle as defined in claim 6 wherein the fourth access means includes a rear door vertically and pivotably mounted to selectively cover the rear access opening.

8. A utility vehicle as defined in claim 7 wherein the storage compartment includes a rectangularly shaped storage compartment formed therein.

* * * * *